United States Patent [19]

Tani et al.

[11] Patent Number: 5,214,913
[45] Date of Patent: Jun. 1, 1993

[54] SERVO VALVE CONTROL APPARATUS

[75] Inventors: Yukiyoshi Tani, Hitachiohta; Sadao Yanada, Hitachi; Takeshi Iwamiya; Takumi Kawai, both of Katsuta; Tadahiko Iijima, Hitachi, all of Japan

[73] Assignee: Hitachi, Ltd., Tokyo, Japan

[21] Appl. No.: 704,139

[22] Filed: May 22, 1991

[30] Foreign Application Priority Data

May 24, 1990 [JP] Japan .................................. 2-134801

[51] Int. Cl.[5] .............................................. F02C 9/26
[52] U.S. Cl. ............................. 60/39.281; 137/625.64; 318/564
[58] Field of Search ................. 60/39.281; 137/625.64; 251/129.09, 129.1; 307/441; 318/564

[56] References Cited

U.S. PATENT DOCUMENTS

| | | | |
|---|---|---|---|
| 3,054,039 | 9/1962 | Meredith | 318/564 |
| 3,469,162 | 9/1969 | Goslin | 318/564 |
| 4,521,707 | 6/1985 | Baker | 310/80 |
| 4,608,820 | 9/1986 | White et al. | 60/39.281 |
| 4,857,762 | 8/1989 | Gaebel | 307/441 |

*Primary Examiner*—Louis J. Casaregola
*Attorney, Agent, or Firm*—Antonelli, Terry, Stout & Kraus

[57] ABSTRACT

A method of and apparatus for controlling a triple-coil servo valve arranged having a tripled control system each of which is composed of components of a coil, a servo amplifier and a controller, the method of and the apparatus for controlling the triple servo valve including means for specifying the abnormality of each of the components, servo amplifier output separation means, means capable of desirably combining the components and means for compensating the servo amplifier. If two control systems of the tripled control system are faulty in such a manner that at least one coil, at least one servo amplifier or at least one controller is abnormal, the triple-coil servo is operated by combining the normal components or by compensating the servo amplifier so that the continuation of the operation of the plant is enabled. Although the operation of the plant employing the conventional structure is shut down if two systems of the tripled control system, each of which is composed of the coil, the servo amplifier and the controller, are abnormal, the continuation of the operation can be enabled according to the present invention while preventing a disturbance of the plant even if the two or the three systems are abnormal by combining normal components and by separating the output from the servo amplifier in a case where the servo amplifier is abnormal.

4 Claims, 16 Drawing Sheets

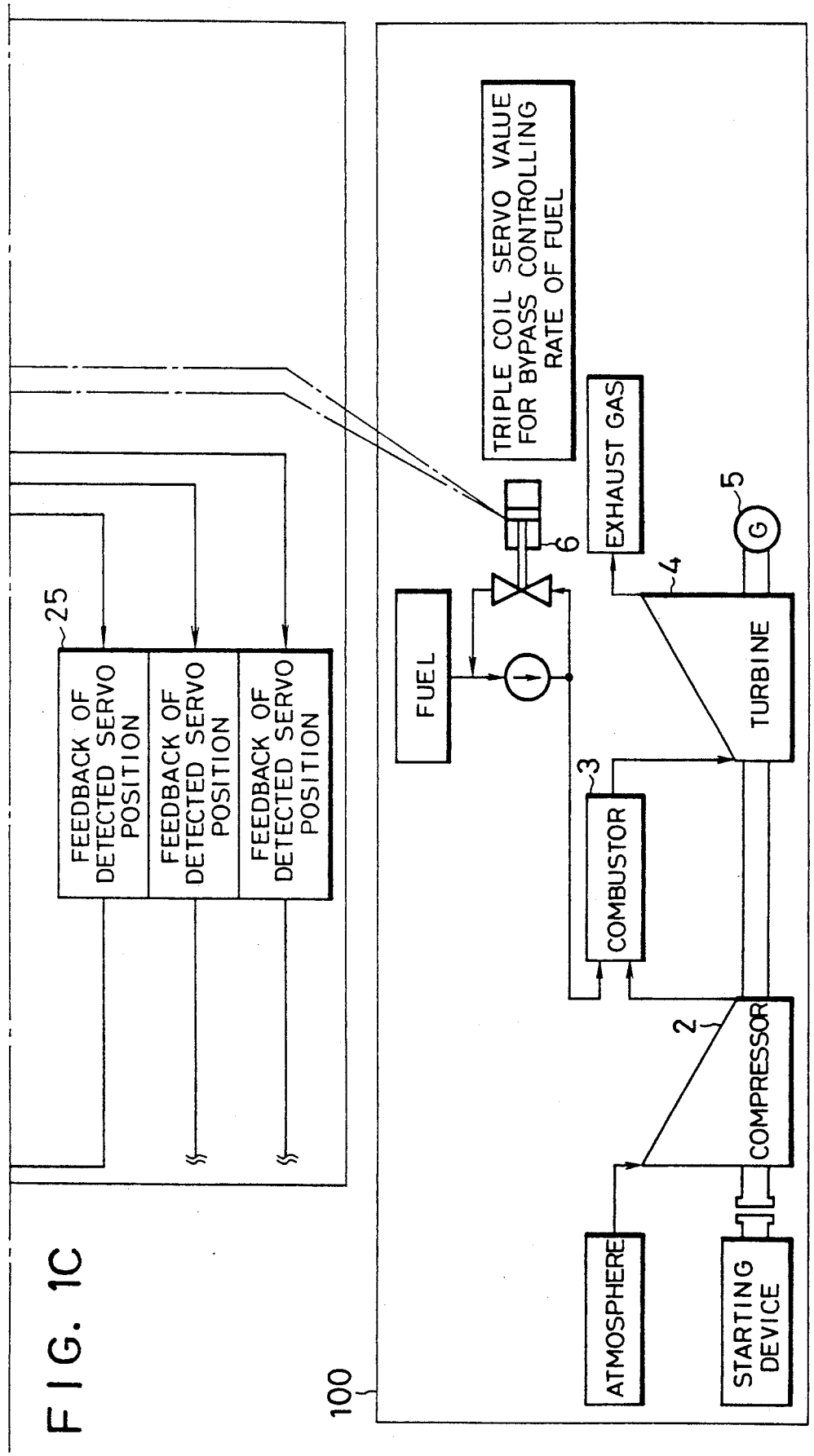

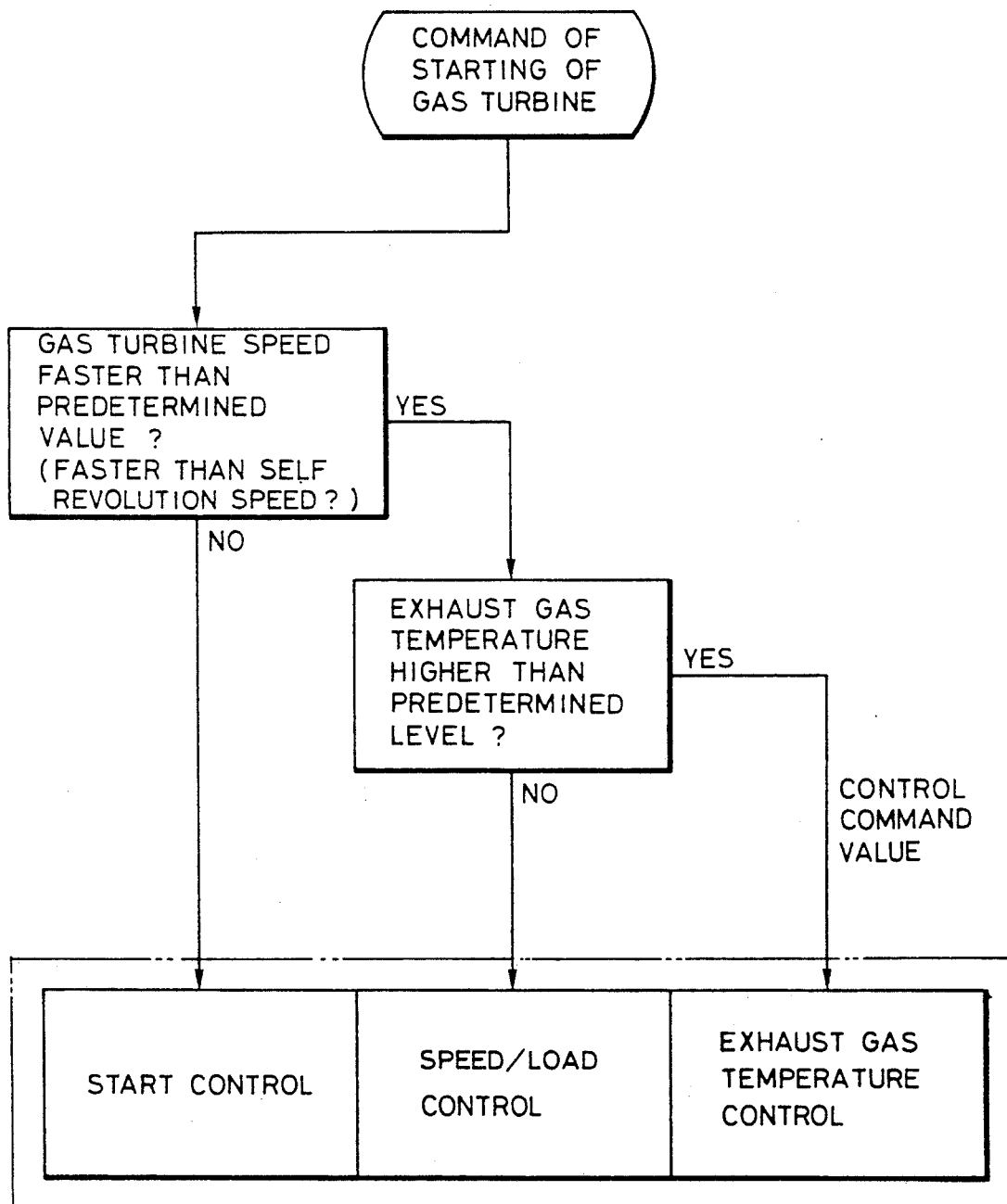

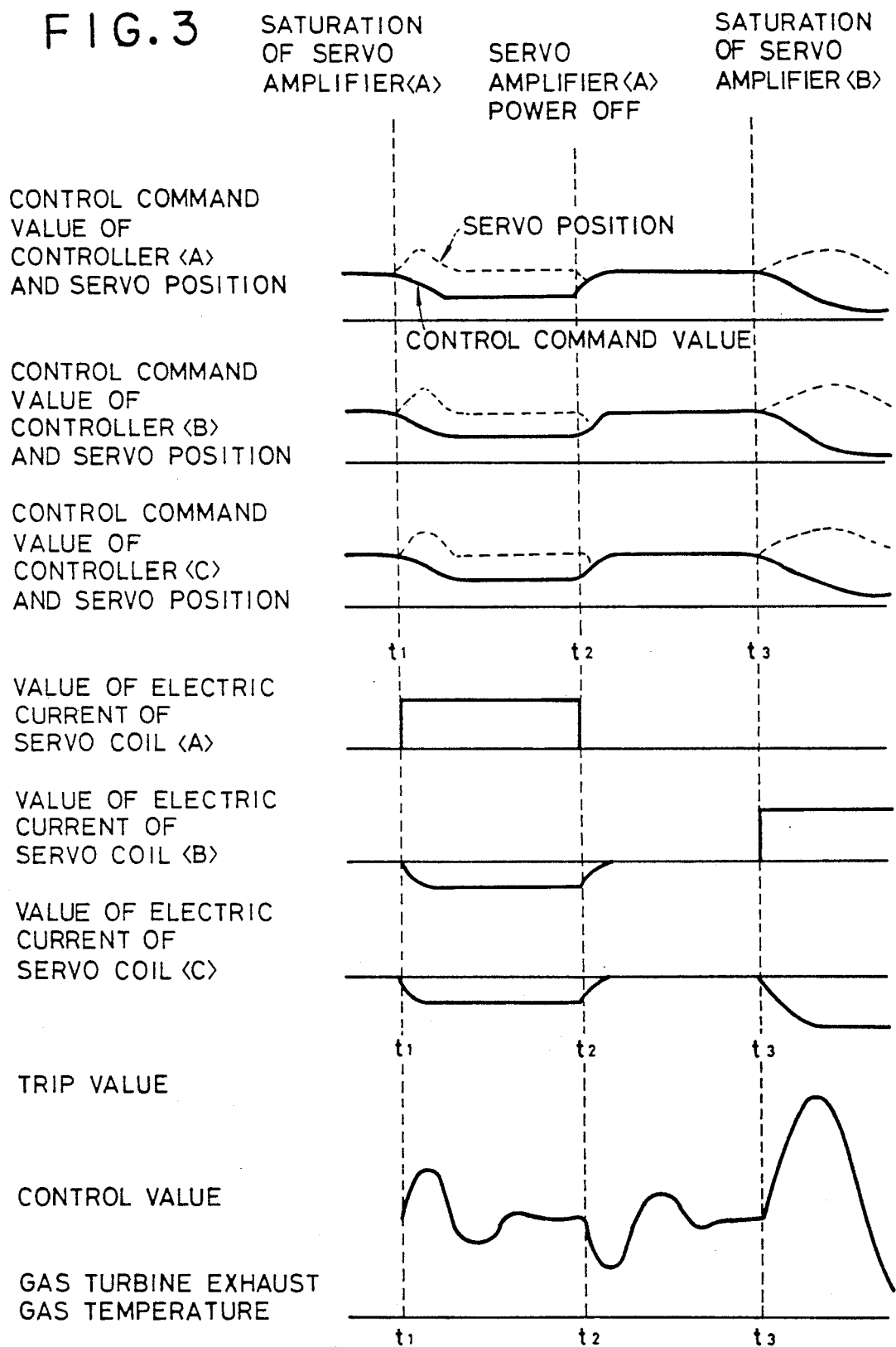

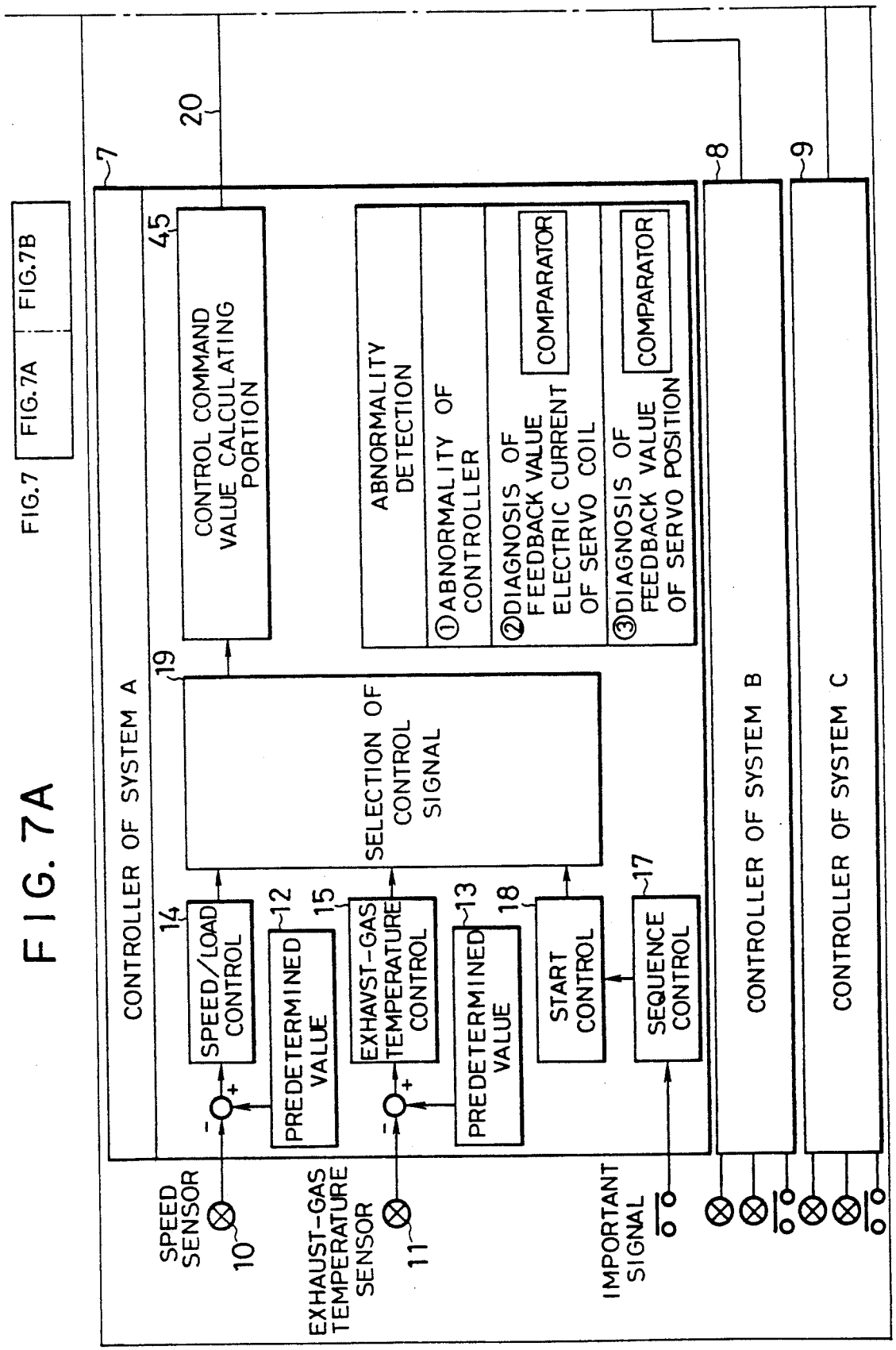

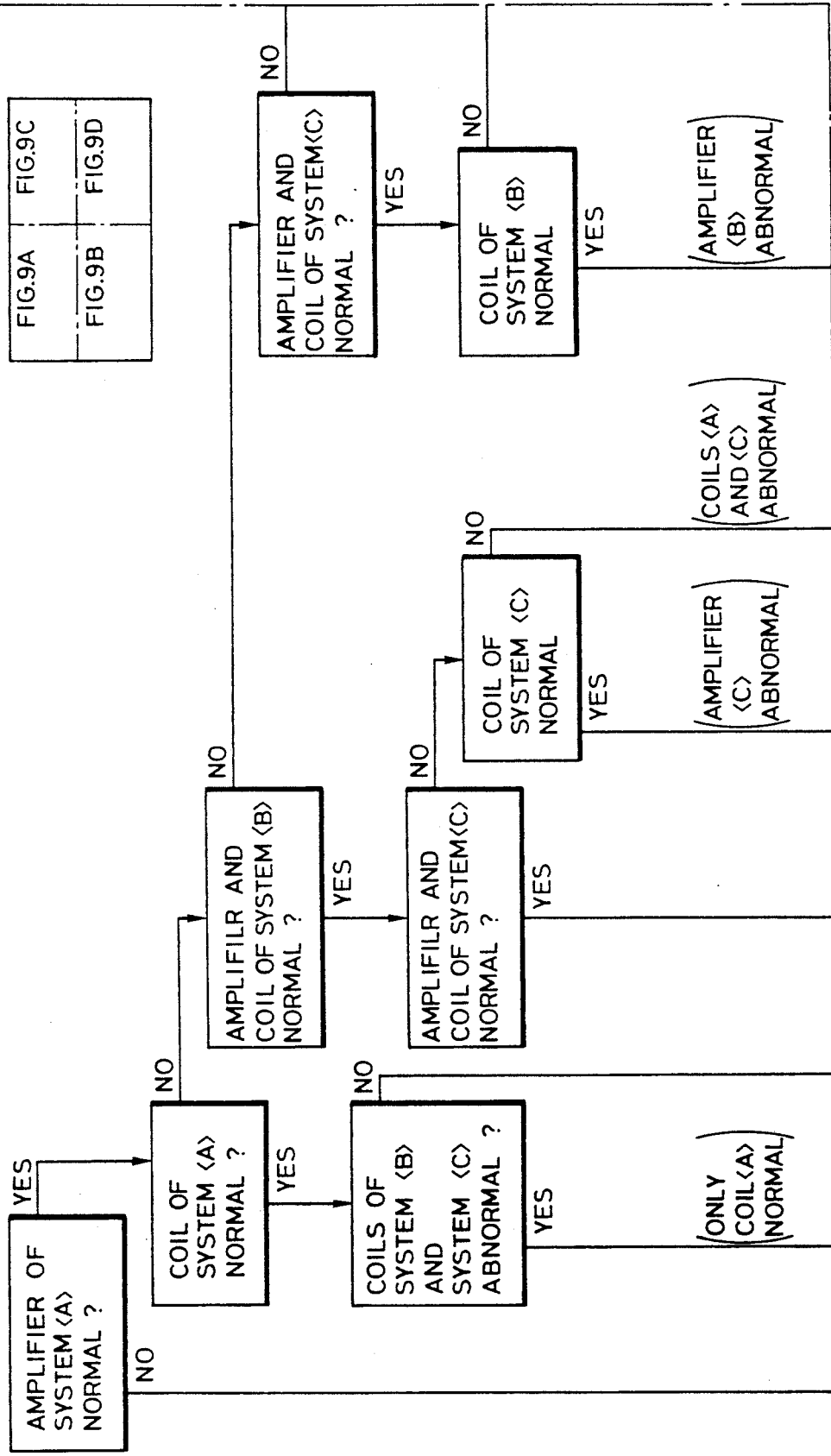

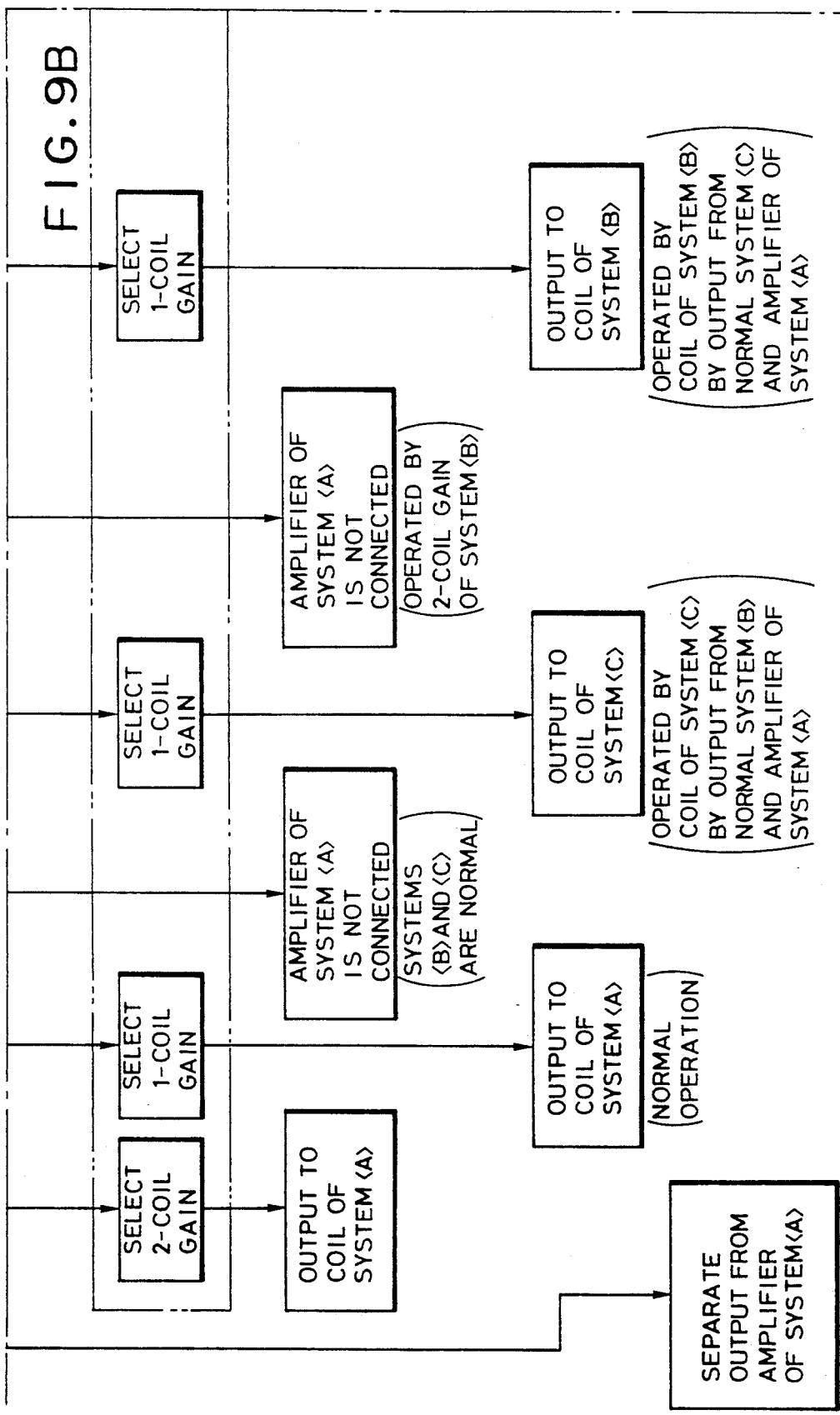

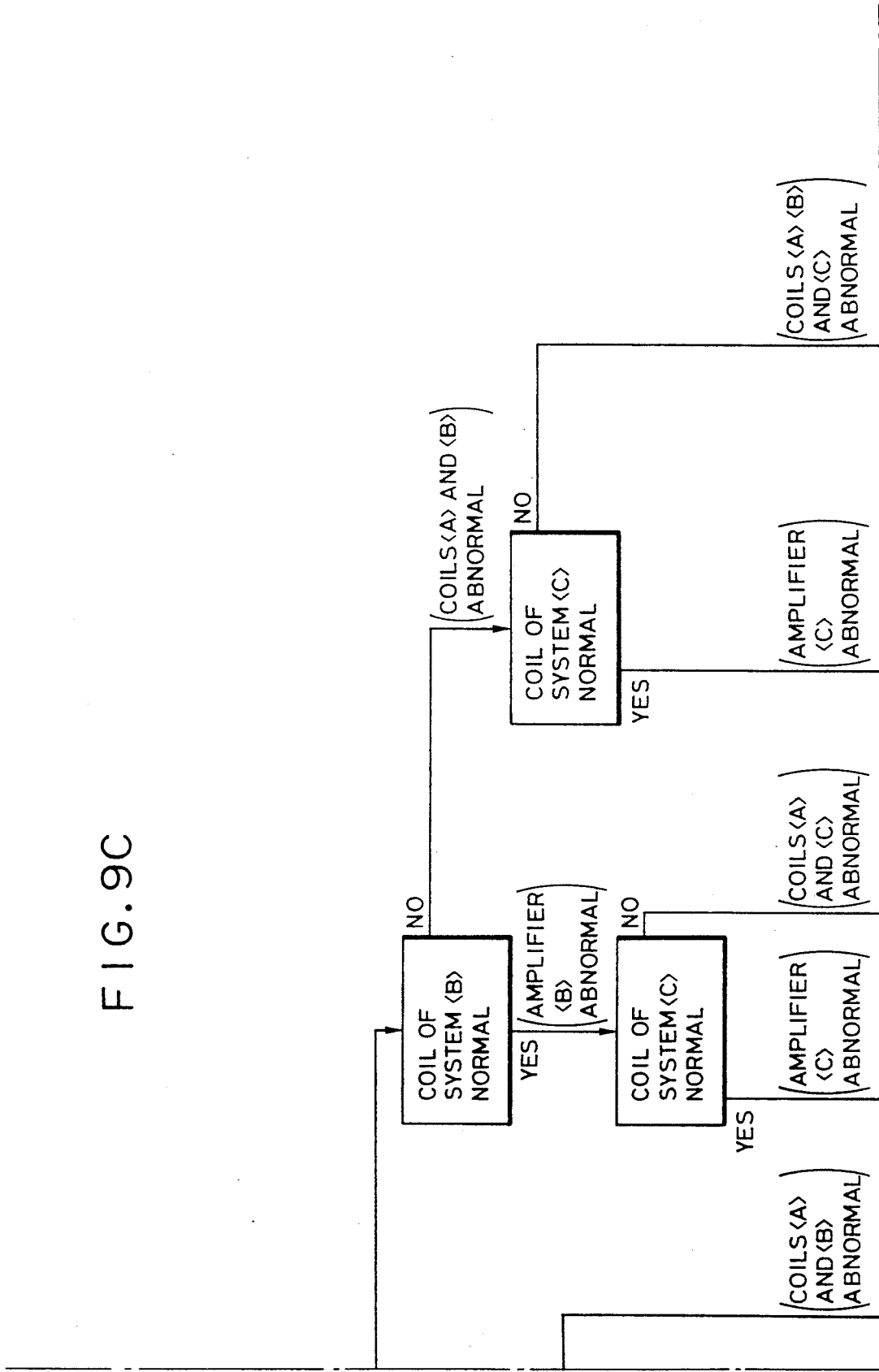

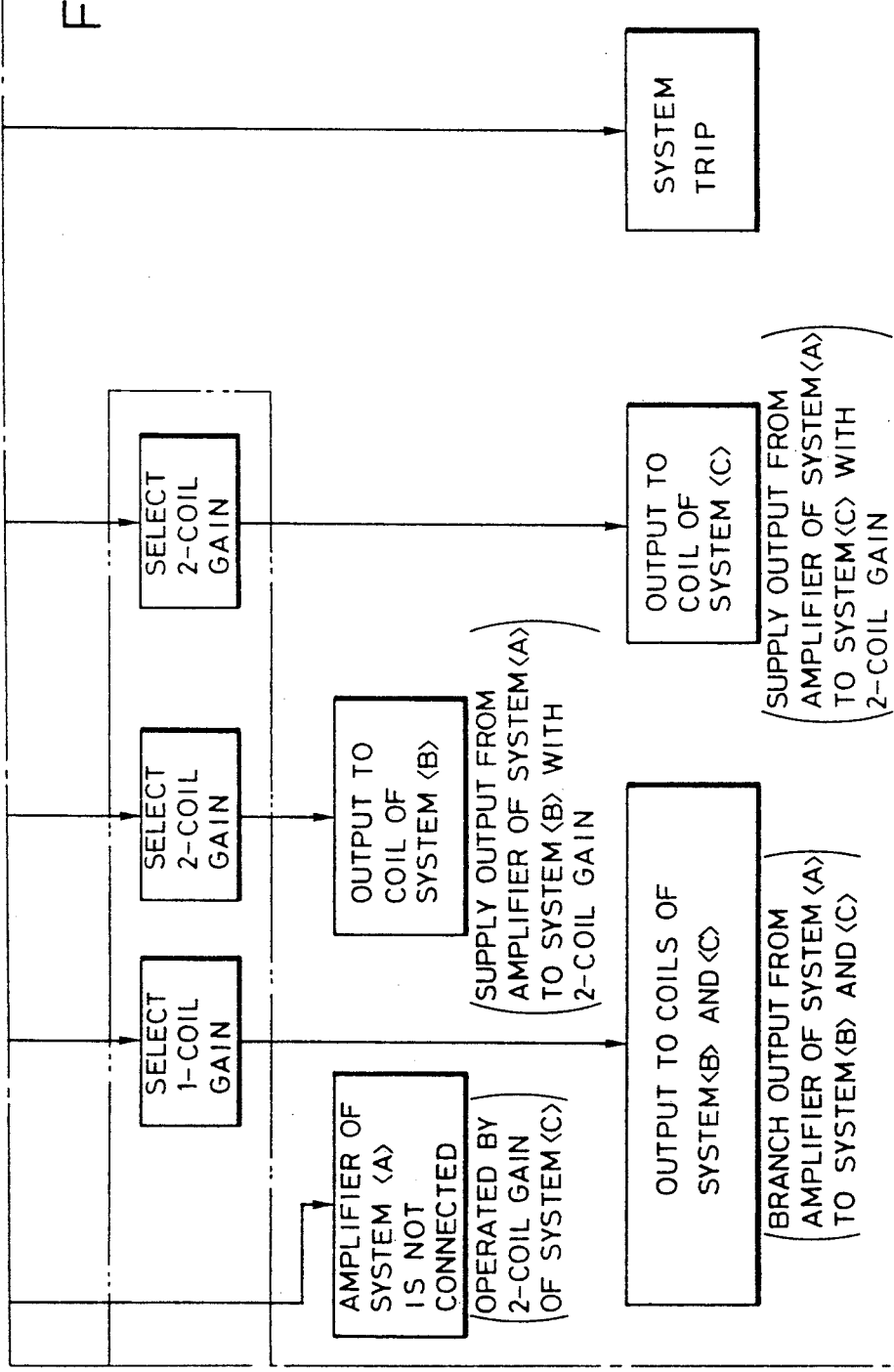

SERVO VALVE CONTROL APPARATUS

BACKGROUND OF THE INVENTION

1. Field of the Invention

The present invention relates to a servo valve control method and apparatus, and, more particularly, to a servo valve control method and apparatus which employs a triplex controller as a unit for controlling a triple-coil servo valve, which is the subject to be controlled, the servo valve control method and apparatus being able to satisfactorily control the turbine in a thermal power plant, an atomic power plant or the like.

2. Description of the Prior Art

There has been known a method of controlling the triple-coil servo valve which is constituted as disclosed in "The SPEEDTRONIC MARK IV control (tm), a distributed fault tolerant gas turbine control system."; ASME 83-GT-106 in such a manner that its control system comprising coils, a servo amplifier and controllers is tripled.

The control system for the triple-coil servo valve has been arranged in such a manner that the output from each of the controllers is supplied to each of the coils via the servo amplifier so as to control the triple-coil servo valve by the total ampere's turn of the coils. Therefore, in a case where there is a fault in any one of the three systems, the residual two systems compensate the faulty system to continue the desired operation. However, if there are faults in the two systems, a decision is made that the system has been tripped.

A similar contents has been disclosed in "Turbine Digital Control and Monitoring (DCM) system"; ASME 88-JPGC/Pwr-33.

A 2-out of 3-logic system has been disclosed in "DIGITAL 2-OF-3 SELECTION AND OUTPUT CIRCUIT"; U.S. Pat. No. 4,857,762. In this literature, a method of driving the relay of a circuit, which employs an optcoupler of the 2-out of 3-logic structure, that is a digital 2-out of 3-logic structure, has been disclosed. According to the above-described disclosure, although a fault signal is selected in a case where faults have been found in the two systems, no description has not been made about an adjustment control signal.

Furthermore, as for the triple-coil servo valve, a structure, which is arranged in such a manner that its actuator is in the form of a tripled system, has been disclosed in "TRIPLE REDUNDANT ELECTRO-MECHANICAL LINER ACTUATOR AND METHOD"; U.S. Pat. No. 4,521,707.

In addition, a servo valve control system arranged in such a manner that its controller is tripled has been disclosed in "MULTISYSTEM CONTROL APPARATUS" (see Japanese Patent Laid-Open No. 59-85501). The above-disclosed structure is arranged to have the tripled controller so that the servo valve can be controlled if the two systems have become faulty. In this state, a standby system, which has been previously provided, is selected in place of the active system. Furthermore, a structure of the triple-coil servo valve control method has been disclosed in "Digital Electric Hydraulic Control Apparatus for Atomic Turbine", Vol. 36, No. 347, August 1985, "Thermal & Atomic Power Generation", which is arranged in such a manner that, if the two coils are disconnected, the residual coil acts to continue the operation. However, the above-described literature has not disclosed a specific means. Furthermore, no description has been made about the operation to be performed in a case where the servo amplifier or the controller has become faulty or a system constituted by combining the above-described components has become faulty.

According to any one of the above-described conventional structures, the operation of the plant has been shut down in a case where the two systems of all of the control systems have become faulty and as well as the residual system is normal or in a case where the faulty system partially contains a normal component.

Since the central control valve of a plant employs the triple-coil servo valve in order to improve reliability, the trip of the triple-coil servo valve usually causes the shutdown of the plant. However, the shutdown of a plant has been usually avoided recently in order to eliminate the social influence.

Furthermore, since the conventional method of controlling the triple-coil servo valve encounters a disturbance generated in the control system thereof if the controller has become faulty, the servo amplifier output from the control system, which includes the faulty controller, is separated from the overall system. However, in a case where the controller is normal and as well as the servo amplifier has become faulty, the servo amplifier output is not separated because the controller is normal. As a result, a problem arises in that a disturbance will be generated in the control system.

SUMMARY OF THE INVENTION

A first object of the present invention is to enable the continuation of the operation of a plant even if two control systems are abnormal by compensating a residual normal system to operate a triple-coil servo valve.

A second object of the present invention is to enable the continuation of the operation of a plant even if a portion of the components of the control system has become faulty by combining the residual normal components or by compensating the same to operate a triple-coil servo valve.

A third object of the present invention is to separate, in a case where a servo amplifier or a controller is abnormal, the output from the servo amplifier of the control system which includes the abnormality after detecting the abnormality of the servo amplifier or the controller for the purpose of protecting the control system from a disturbance.

In order to achieve the above-described objects, a method of controlling a triple-coil servo valve according to the present invention is arranged in such a manner that, if at least one controller, at least servo amplifier or at least one coil has become faulty, normal components except for the faulty controller, servo amplifier or coil are combined to establish one normal control system so that the triple-coil servo valve is operated.

Another method of controlling the triple-coil servo valve according to the present invention is arranged in such a manner that, if the two control systems of the tripled control system are abnormal, the control system is compensated so that the tripled-coil servo valve can be operated by the other normal control system.

Another method of controlling the triple-coil servo valve according to the present invention is arranged in such a manner that, if the two control systems of the tripled control system are abnormal and as well as if at least one controller, at least one servo amplifier or at least one coil included in the abnormal system is normal, the normal controller, the servo amplifier and the coil are combined to establish a normal control system so that the triple-coil servo valve is operated.

Another method of controlling the triple-coil servo valve according to the present invention is arranged in such a manner that, when at least one component of a certain system and as well as at least one component of another system have become faulty, normal components of the residual normal control system or the abnormal system are compensated so that the triple-coil servo valve is operated.

The above-described compensation according to the method of controlling the triple-coil servo is realized by using a sub-servo amplifier by changing the gain of a servo amplifier. Another way of compensation is to recombine a normal control system by switching normal components of the abnormal system.

Another method of controlling the triple-coil servo valve according to the present invention is arranged in such a manner that, if at least one servo amplifier or the controller is abnormal, the output from the servo amplifier of the control system including the above-described abnormal component is separated.

An apparatus for controlling a triple-coil servo valve according to the present invention comprises: compensation means having a compensation circuit for compensating the output from the controller and a switch circuit for switching the connection of the compensation circuit and the components of the control system; and abnormality detection means which detects the abnormality of the control system so as to operate the compensation means.

Another apparatus of the triple-coil servo valve according to the present invention comprises: compensation means having a compensation circuit for compensating the output from the controller and a switch circuit for switching the connection of the compensation circuit and the components of the control system; abnormality detection means which detects the abnormality of the control system so as to operate the compensation means; and means for separating, if at least one controller or servo amplifier of the control system is abnormal, the output from the output from the servo amplifier of the abnormal system. the output Other and further objects, features and advantages of the invention will be appear more fully from the following description.

BRIEF DESCRIPTION OF THE DRAWINGS

FIGS. 1A, 1B and 1C illustrate the structure of an embodiment of a triple-coil servo valve control apparatus according to the present invention;

FIG. 2 is a flow chart for selecting a control command value;

FIG. 3 illustrates the characteristics of a conventional triple-coil servo;

FIGS. 7A and 7B illustrate another embodiment of the present invention;

FIGS. 9A-9D are a flow chart for outputting of the amplifier of the system A.

DETAILED DESCRIPTION OF THE EMBODIMENTS

Preferred embodiments of the invention will now be described.

Figure 1A:
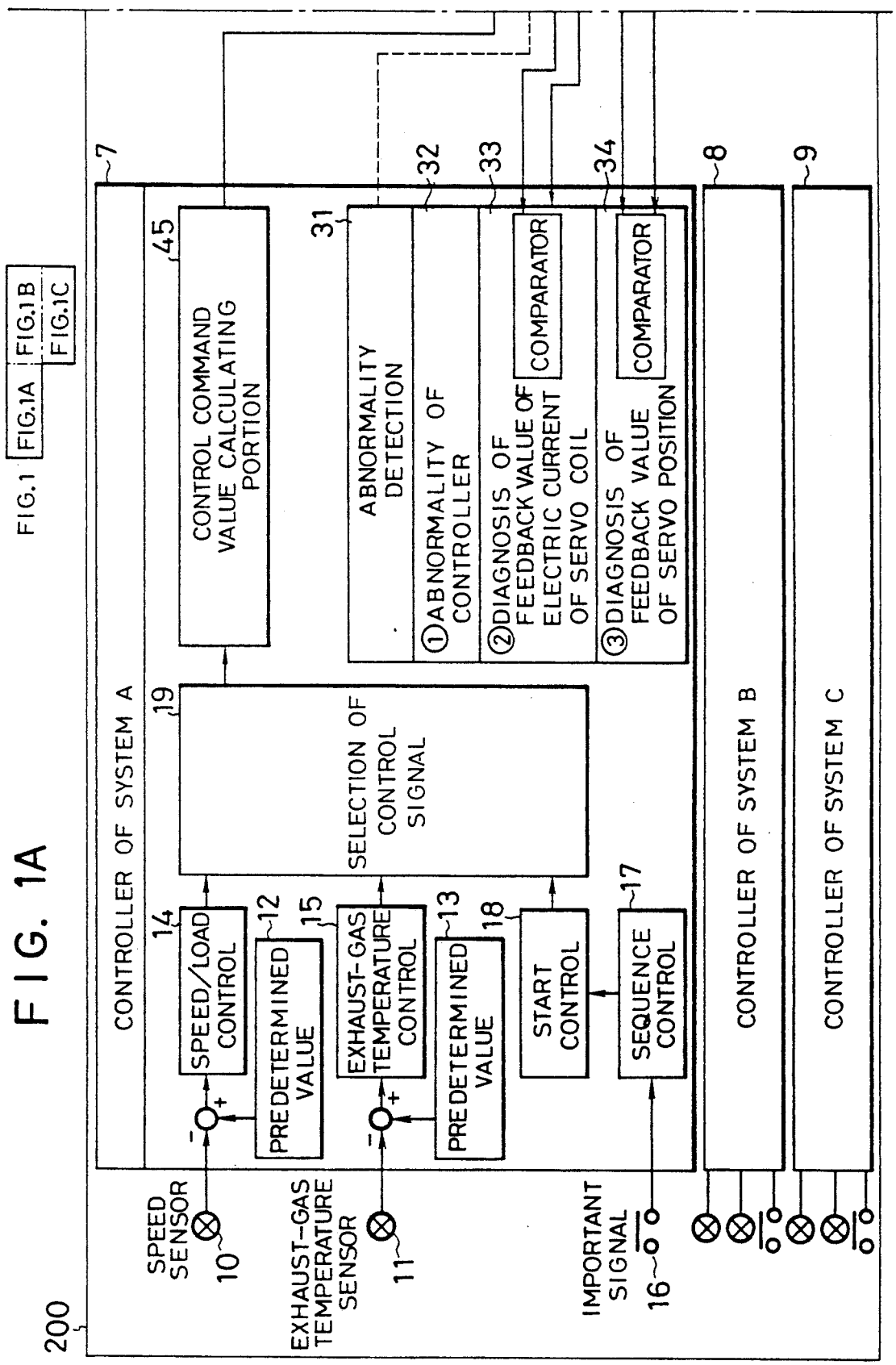
Figure 1B:
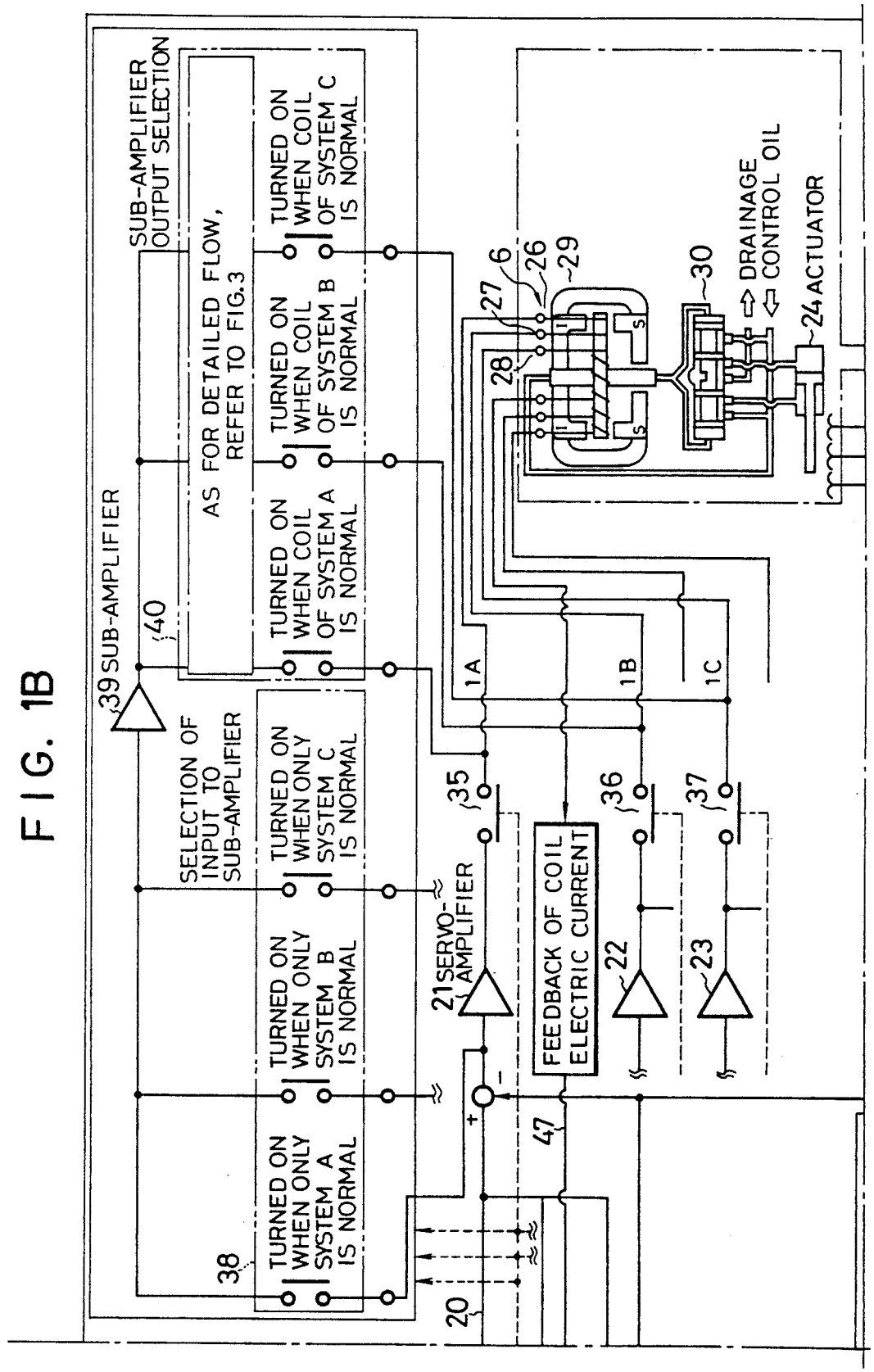

FIGS. 1A~1C show an embodiment of the structure of a servo valve control apparatus 200 of a gas turbine system 100. The gas turbine system 100 has a combustor 3 which combusts fuel introduced from outside by a fuel transfer pump 1 and high pressure air compressed by a compressor 2, causing high pressure hot gas to be generated. The energy of the generated gas rotates a turbine 4 at high speed, causing a generator 5 to be driven. Consequently, electric energy can be supplied. The output energy from the gas turbine is determined in accordance with the flow rate of the fuel, the flow rate being changed by controlling a triple-coil servo valve 6 for bypass-controlling the flow rate of the fuel.

The triple-coil servo valve 6 for bypass-controlling the flow rate of the fuel is controlled by a tripled system control system of a servo valve control apparatus 200, the tripled system control system being composed of a controller 7 of system A, a controller 8 of system B and a controller 9 of system C. Each of the above-described controllers 7, 8 and 9 carries out the same calculations. Thus, the operation of the servo valve 6 is controlled in accordance with the result of synthesizing the values obtained from the above-described calculations.

Each of the controllers 7, 8 and 9 has a speed/load control system 14 and an exhaust-gas temperature control system 15 respectively receiving signals from a speed sensor 10 and an exhaust-gas temperature sensor 11 which are fastened to the body of the gas turbine. Then, the speed/load control system 14 and the exhaust-gas temperature control system 15 make comparisons between the values denoted by received signals and a predetermined speed level 12 and a predetermined exhaust-gas temperature level 13 so as to perform the control in such a manner that the predetermined levels are realized. In each of the controllers 7, 8 and 9, important signals for use at the time of starting, shutting down and securing the system are supplied to a sequence control system 17 so as to be subsequently, together with a control signal transmitted from a start control system 18, received by a control signal selection portion 19. The control signal selection portion 19 selects the signal of the minimum level, and a control command value calculating portion 45 processes a control command value 20 in accordance with the selected signal. The signals left from the selection serve as backup signals with respect to the control command value 20.

A flow chart for an operation in which the control command value 20 is selected by the control signal selection portion 19 is shown in FIG. 2.

The gas turbine is started in response to an issued start command in such a manner that a start control is employed as the control command value 20 until the gas turbine is able to rotate. Since the speed has not been raised to the predetermined level, the value of a speed/load control is larger than that of the start control. Similarly, since the exhaust-gas temperature has not been raised to a predetermined level, the value of exhaust-gas temperature control is larger than that of the speed-load control and the start control. Therefore, the control signal selection portion 19 for selecting the minimum level signal selects the start control as the control command value 20.

When the revolution of the gas turbine reaches the self-rotatable revolution, the speed/load control is selected because the speed has been raised to the predetermined speed. Since the value of the start control at this time is set to be higher than the value of the speed/load control, the commanded value of the speed/load control, which is the minimum value, is selected.

When the exhaust-gas temperature is raised to be higher than the predetermined level, the exhaust-gas temperature control is selected as the control command value. At this time, each of the start control and the speed/load control serves as a backup.

The above-described discrimination is made in the control signal selection portion 19 of the controller by means of software in accordance with the flow chart shown in FIG. 2.

Referring back to FIGS. 1A~1C in which the servo valve control apparatus 200 is shown, the control command value 20 supplied from each of the controllers 7, 8 and 9 is received by servo amplifiers 21, 22 and 23 of each of the systems. Each of the servo amplifiers 21, 22 and 23 receives a feedback signal 25 and the control command value 20 for each of the systems, the feedback signal 25 being a signal supplied from a servo valve position detector 25 which feeds back the control quantity of an actuator 24 of the triple-coil servo valve 6. The servo amplifiers 21, 22 and 23 respectively amplify the signals to levels which are able to operate servo coils 26, 27 and 28 before they are transmitted to the servo coils 26, 27 and 28. The triple-coil servo valve 6 operates a torque motor 29 by the total of driving torque generated in each of the servo coils 26, 27 and 28. As a result, the triple-coil servo valve 6 controls the actuator 24 by operating a cylinder 30.

Each of the controllers has an abnormality detection device 31 which is constituted by a controller abnormality detection portion 32, a feedback value diagnosis portion 33 for diagnosing the feedback value of a servo coil electric current and a feedback value diagnosis portion 34 for diagnosing the feedback value of the servo position.

The controller abnormality detection portion 32 possesses a function of a CPU for diagnosing the abnormality of the controller.

The feedback value diagnosis portion 33 for diagnosing the servo coil electric current makes a comparison between the control command value 20 of the controller and a feedback value 47 of the servo coil electric current so as to diagnose the abnormality of the servo coil or the servo amplifier. The abnormality of the servo coil is exemplified by a disconnection of the servo coil. In this case, the feedback value 47 of the coil electric current is zero. In a case where the servo amplifier has become faulty, the feedback value 47 of the coil electric current is a saturated electric current value.

The feedback value diagnosis portion 34 for diagnosing the feedback value of the servo position makes a comparison between the control command value 20 of the controller and a feedback value 46 of the servo position detector 25 so as to diagnose the abnormality of the servo position detection portion. That is, if there is a fault, the control command value 20 and the feedback value 46 are different values.

The abnormality detection device 31 causes each of the controllers to diagnose the abnormality of each of the components in the control system, for example, the abnormality of the controller, that of the servo amplifier, that of the servo coil and that of the servo position detector.

Table 1 shows the abnormality diagnosis means and the contents of the abnormality diagnoses.

TABLE 1

| Abnormality | Abnormality Mode | Abnormality Detection means | Contents of Detected Abnormality |
|---|---|---|---|
| Abnormality of controller | Abnormality of controller of system <A> | Detected by function of detecting abnormality of controller of system <A> | Function of diagnosing abnormality of Computer (CPU) (diagnosed by memory parity, error detection or watch dog timer detection) |
|  | Abnormality of controller of system <B> | Detected by function of detecting abnormality of controller of system <B> |  |
|  | Abnormality of controller of system <C> | Detected by function of detecting abnormality of controller of system <C> |  |
| Abnormality of servo amplifier | Abnormality of servo amplifier of system <A> | Detected by diagnosis of feedback value of coil electric current of system <A> | Discriminated by making a comparison between control command value and feedback value of coil electric current (coil electric current becomes saturated to be different from control command value) |
|  | Abnormality of servo amplifier of system <B> | Detected by diagnosis of feedback value of coil electric current of system <B> |  |
|  | Abnormality of servo amplifier of system <C> | Detected by diagnosis of feedback value of coil electric current of system <C> |  |
| Abnormality of disconnection of servo coil | Abnormality of disconnection of servo coil of system <A> | Detected by diagnosis of feedback value of coil electric current of system <A> | Discriminated by making a comparison between control command value and feedback value of coil electric current |
|  | Abnormality of disconnection of servo coil of system <B> | Detected by diagnosis of feedback value of coil electric current of system <B> |  |

TABLE 1-continued

| Abnormality | Abnormality Mode | Abnormality Detection means | Contents of Detected Abnormality |
|---|---|---|---|
|  | Abnormality of disconnection of servo coil of system <C> | Detected by diagnosis of feedback value of coil electric current of system <C> | (since servo coil is disconnected, feedback value of electric current is always zero) |
| Abnormality of servo position detector | Abnormality of servo position detector of system <A> | Detected by diagnosis of feedback value of detected servo position of system <A> | Discriminated by making a comparison between control command value and feedback value of detected servo position (feedback value of detected servo position and control command value are different from each other) |
|  | Abnormality of servo position detector of system <B> | Detected by diagnosis of feedback value of detected servo position of system <B> |  |
|  | Abnormality of servo position detector of system <C> | Detected by diagnosis of feedback value of detected servo position of system <C> |  |

Then, the characteristics of the triple-coil servo of the conventional system are shown in FIG. 3, and the problems taken place in the conventional system will now be described referring to FIG. 3.

The axis of ordinate of FIG. 3 shows the control command value 20 of each of the controllers of the systems A, B and C, the servo position 46, the value of the electric current of the triple-servo coil and the temperature of the exhaust gas from the gas turbine, while the axis of abscissa stands for time. FIG. 3 shows a fact that the servo amplifier of the system A is saturated at t1, the power supply to the servo amplifier of the system A is stopped at t2 and the servo amplifier of the system B is saturated at t3. The saturation of the servo amplifier is an example of the abnormal status of the servo amplifier.

When the servo amplifier A is saturated (that is, at $t_1$), the output from the servo amplifier B and that from the servo amplifier C show negative values so as to compensate the saturated electric current of the servo amplifier A or a deflection quantity larger than the control command value 20 is generated due to the mechanical delay of the servo cylinder 30 or the like although omitted from illustration. As a result, the servo position is raised higher than the control command value 20, causing the triple-coil servo 6 for bypass-controlling the flow rate of fuel to be made larger than the degree of opening denoted by the control command value 20. Therefore, the flow rate of fuel in the gas turbine is increased and the temperature of the exhaust gas from the gas turbine is transiently raised.

However, if the exhaust gas temperature 11 is higher than the predetermined exhaust-gas temperature level 13 of the exhaust gas temperature control 15, the exhaust-gas temperature control 15 selects the signal of the exhaust-gas temperature control 15, which is the minimum signal, in accordance with control signal selection 19 for transmitting a reduction signal. As a result, the control command value 20 is reduced, causing the triple-coil servo 6 for bypass controlling the flow rate of fuel to be closed. Therefore, a control is performed in such a manner that the exhaust gas temperature is lowered.

Therefore, although the temperature of the exhaust gas is transiently raised, its level does not reach a trip level which critically influences the thermal stress of the gas turbine, causing no problem in the operation to be generated.

Then, an operator detects the fault through the abnormality detection device 31 of the controller and turns of the power to be supplied to the saturated servo amplifier of the system A. That is, each of the components is brought to a state at time t2 and the operation is continued thereafter.

However, if the servo amplifier B has been saturated in the above-described state, two systems have become faulty. That is, since a state at time $t$: is realized, a time delay of about two times that at the time of the abnormality of one system will be generated despite the compensating operation of the residual servo amplifier C. As a result, the quantity of deflection between the control command value 20 generated during the above-described time delay and the actual degree of opening will open the fuel flow rate bypass control valve 6. Therefore, the flow rate of fuel is increased, and the temperature of the exhaust gas from the gas turbine exceeds the trip value. Consequently, it has been impossible to continuously operate the plant if the two systems of all of the systems have become faulty.

According to this embodiment, the servo valve control apparatus 200 shown in FIGS. 1A~1C are arranged in such a manner that the abnormality of the controller, that of the servo amplifier, that caused from the disconnection of the servo coil and that of the servo position detector are detected by the abnormality detection device 31 of each of the controllers. Furthermore, servo amplifier output separation switches 35, 36 and 37 for omitting the faulty component from the operation of controlling the plant are provided. In addition, in order to effectively operate the normal systems, a compensating means comprising a sub-amplifier input selection switch 38, a sub-amplifier 39 and a sub-amplifier output selection switch 40 is provided.

Then, a method of diagnosing the abnormality and the separation of the output from the servo amplifier according to this embodiment will now be described with reference to FIG. 4. The abnormality diagnosis is performed in such a manner that a fact whether or not the controller is normal is first determined by the controller abnormality detection portion 32. If the controller is abnormal, the output from the servo amplifier of the faulty system is separated from the overall system by the switch of the switches 35, 36 and 37 which is connected to the faulty system.

If the controller is normal, the fact that the servo position detector is abnormal/normal is determined by the control command value 20 and the portion 34 for diagnosing the feedback value of the servo position. If it has been determined that it is abnormal, a determination is made that the feedback servo position of the subject system is abnormal.

If the feedback value of the servo position is normal, a fact whether or not the control command value 20 and the feedback value 47 of the coil electric current are the same is determined by the servo electric current feedback value diagnosing portion 33. If the feedback value 47 of the coil electric current is always "0" although the control command value 20 has been changed, a determination is made that the abnormality has been generated due to the disconnection of the coil of the subject system. If the deflection quantity between coil electric current feedback value 47 and the control command value 20 shows the saturated electric current value although the coil electric current feedback value 47 or the control command value 20 has been changed, a determination is made that the servo amplifier of the subject system is abnormal. Simultaneously, any one of the switches 35, 36 and 37 for separating the output from the servo amplifier of the faulty system is operated so as to separate the output from the servo amplifier of the faulty system.

Figure 4:
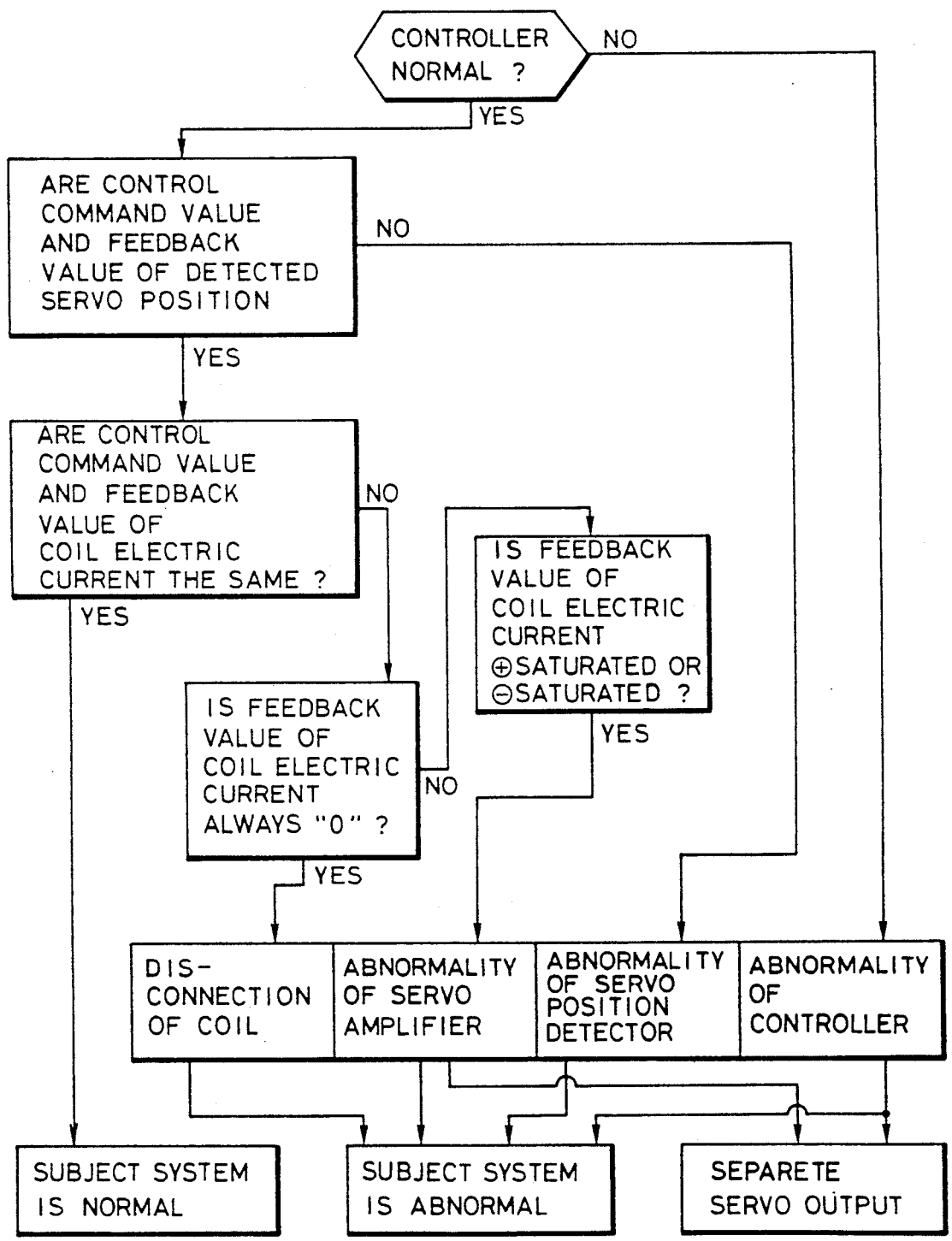
FIG. 4 is a flow chart for diagnosing abnormalities and separating the output from the servo amplifier.

The above-described determination is made by the abnormality detection device included in the controller in accordance with a flow chart shown in FIG. 4 and previously loaded software.

Then, a flow of selecting I/0 to and from the sub-amplifier will be described with reference to FIGS. 5A and 5B. First, it is determined whether or not the system A is normal (all of the controller of the system A, the servo amplifier of the system A, the servo position detector of the system A and the coil of the system A are normal). If there is a fault in the system A, a determination is made whether or not the system B is normal. If the system B is abnormal, it can be said that both the systems A and B are abnormal. Therefore, the sub-amplifier input selection switch 38 is switched over so as to select the output from the normal system C. Therefore, the input to the sub-amplifier is selected when only one system of the systems A, B and C is normal and the residual two system are abnormal. As a result, a normal value is always input to the sub-amplifier 39, and the output from the sub-amplifier 39 shows a normal value. Then, the output from the sub-amplifier 39 is selected by the amplifier output selection switch 40 and the output from the system having the normal coil is selected so as to output it. At this time, if only the system A is normal, a selection of the system having a normal coil is made in a sequential order of B and C. A normal output from the normal system A via the sub-amplifier 39 is transmitted to the servo coil B or C. As a result, an operation similar to a case in which two coils of the three coils are normal is performed by the normal system A and the output servo coil of the system B or C although the systems B and C are abnormal. Therefore, the continuation of the operation of the plant can be enabled.

If a disconnections of the coils B and C are taken place at this time, the sub-amplifier output selection switch 40 selects the residual normal coil A. The servo coil output from the normal system A and the output from the sub-amplifier selected by the sub-amplifier output selection switch 40 are added to the normal coil A. Therefore, its torque is made to be two times the normal torque, causing the response of the one servo coil of the system A to be the same as the operation performed in a case where the two coils act. As a result, although the coils of the systems B and C have been disconnected, only the coil of the normal system A is able to act similarly to the case where the two coils of the three coils are normal. Consequently, the continuation of the operation of the plant can be enabled.

Subsequently, whether or not the systems A, B and C are normal is determined similarly to the above-described case in such a manner that the input of the normal system to the sub-amplifier 39 is selected by the sub-amplifier input selection switch 38 and the sub-amplifier output selection switch 40 so as to output it to the system having the normal servo coil.

Figure 5A:
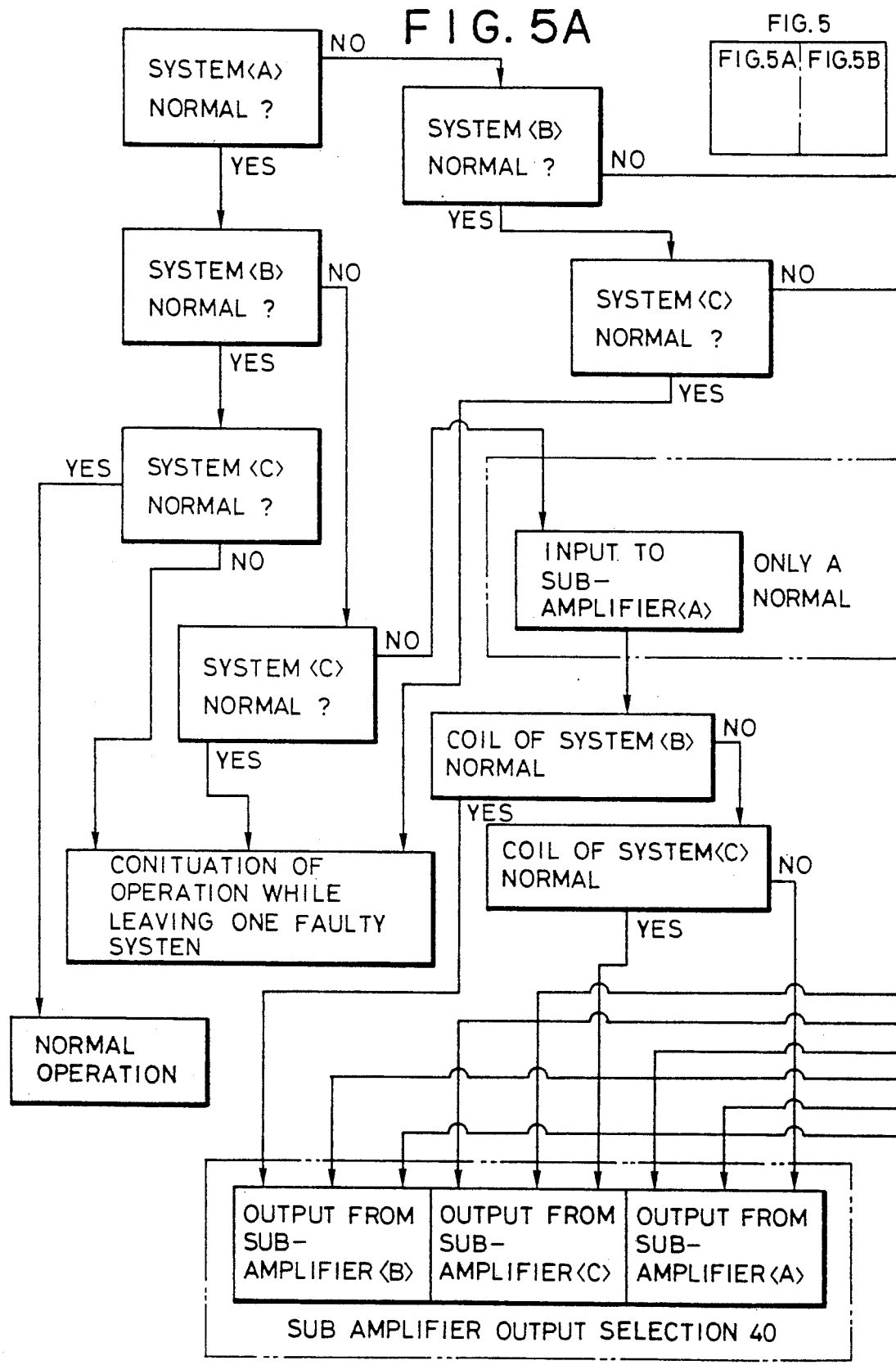
FIGS. 5A and 5B are a flow chart for selecting the I/O to and from a sub-amplifier.
Figure 5B:
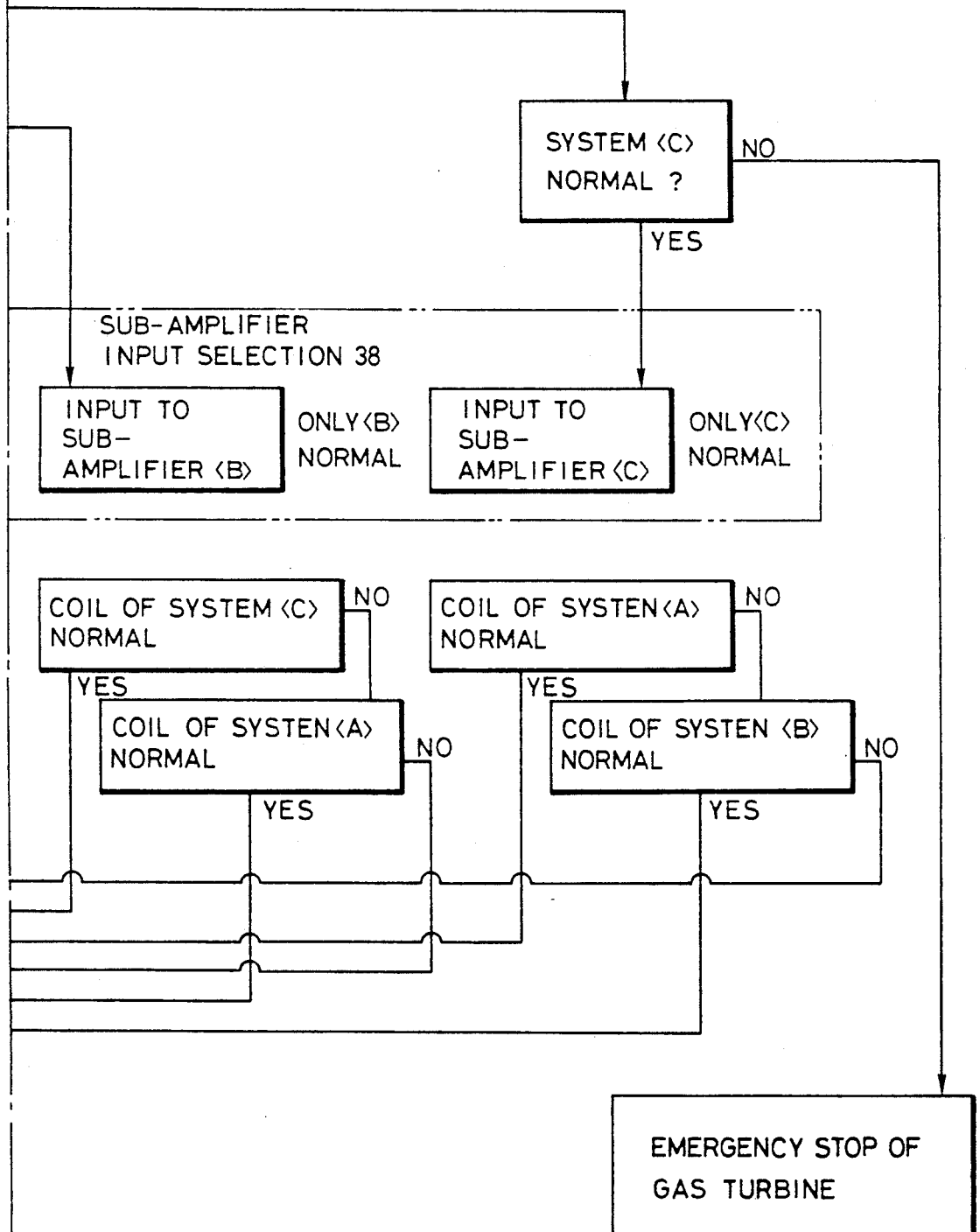

The above-described selection is made by the sub-amplifier input selection switch 38 or the sub-amplifier output selection switch 40 in accordance with the flow chart shown in FIGS. 5A, 5B and software previously loaded.

Figure 6:
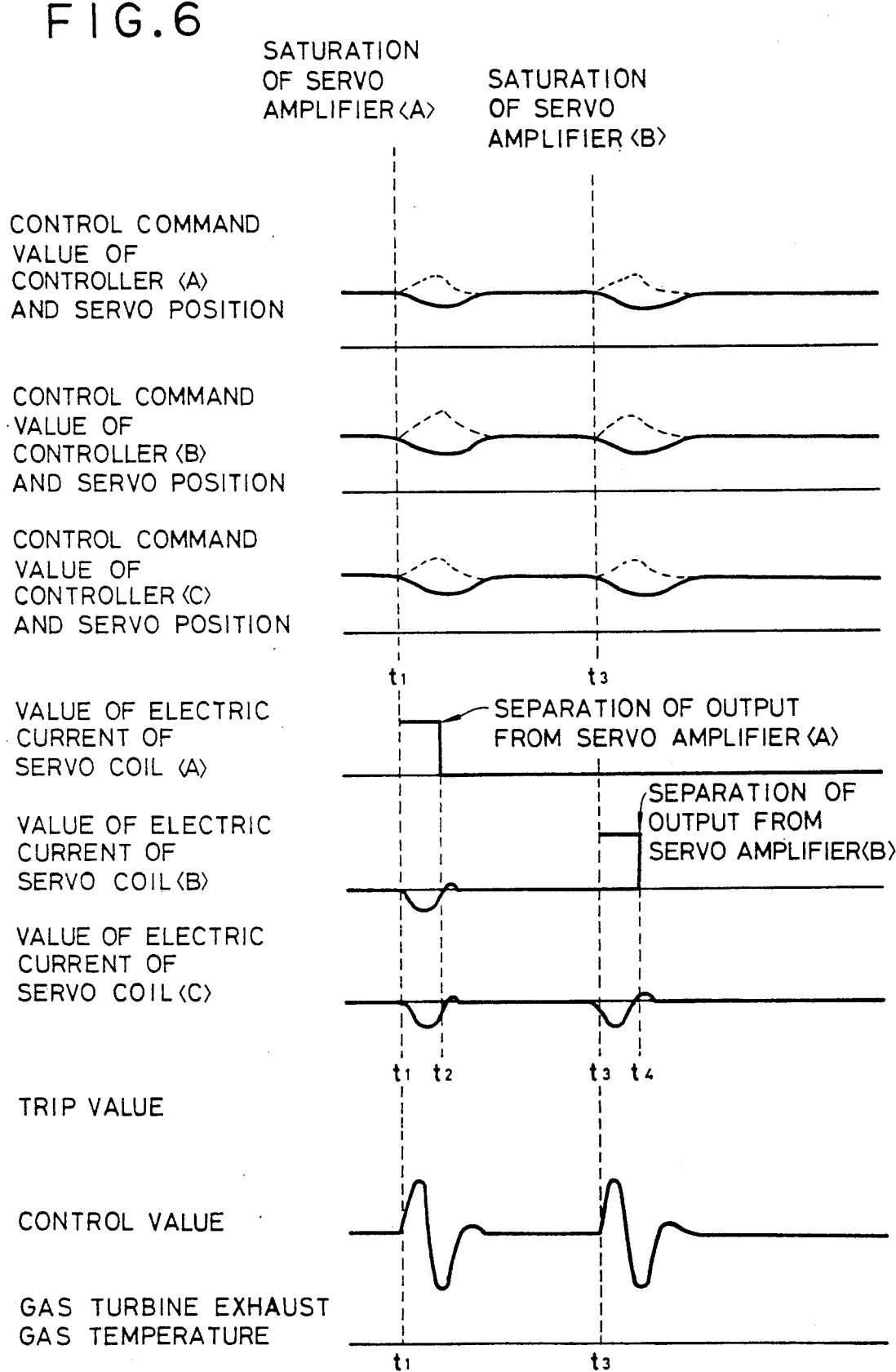
FIG. 6 illustrates the characteristics of the triple-coil servo according to the present invention.

The characteristics of the triple-coil servo will now be described with reference to FIG. 6.

In a case where the servo amplifier A is saturated (t1), the abnormality has been detected in accordance with result of the diagnosis of the feedback value of the electric current of the servo coil performed by the diagnosis portion 33 of the abnormality detection device 31 of the controller of the system A. The controller A immediately separates the output from the servo amplifier with the output separation switch 35 (t2) Therefore, the influence of the abnormality upon the plant due to the saturation of the servo amplifier of the system A can be reduced in comparison to the conventional case shown in FIG. 3. In a case where the servo amplifier of the system B is saturated in the above-described state, that is, in a case of $t_3$, the controller of the normal system C input its output to the sub-amplifier 39 by the controller switch 38. Furthermore, the output from the sub-amplifier 39 is transmitted to the system A, which is a system having the normal servo coil (in this state, although the output may be transmitted to the system A or B, an assumption is made that the output to the system A is made). Therefore, the electric current of the servo coil of the system A compensates the saturated electric current of the system B as well as the electric current of the servo coil of the system C when the servo amplifier of the system B is saturated. As a result, the continuation of the operation can be enabled safely.

In a case where the servo coils of the two systems are disconnected, the output from the sub-amplifier is selected to be output to the servo coil of the residual normal system. As a result, the output with which the torque of the two coils can be obtained from one servo coil is made, causing the continuation of the operation to be enabled.

Figure 7B:
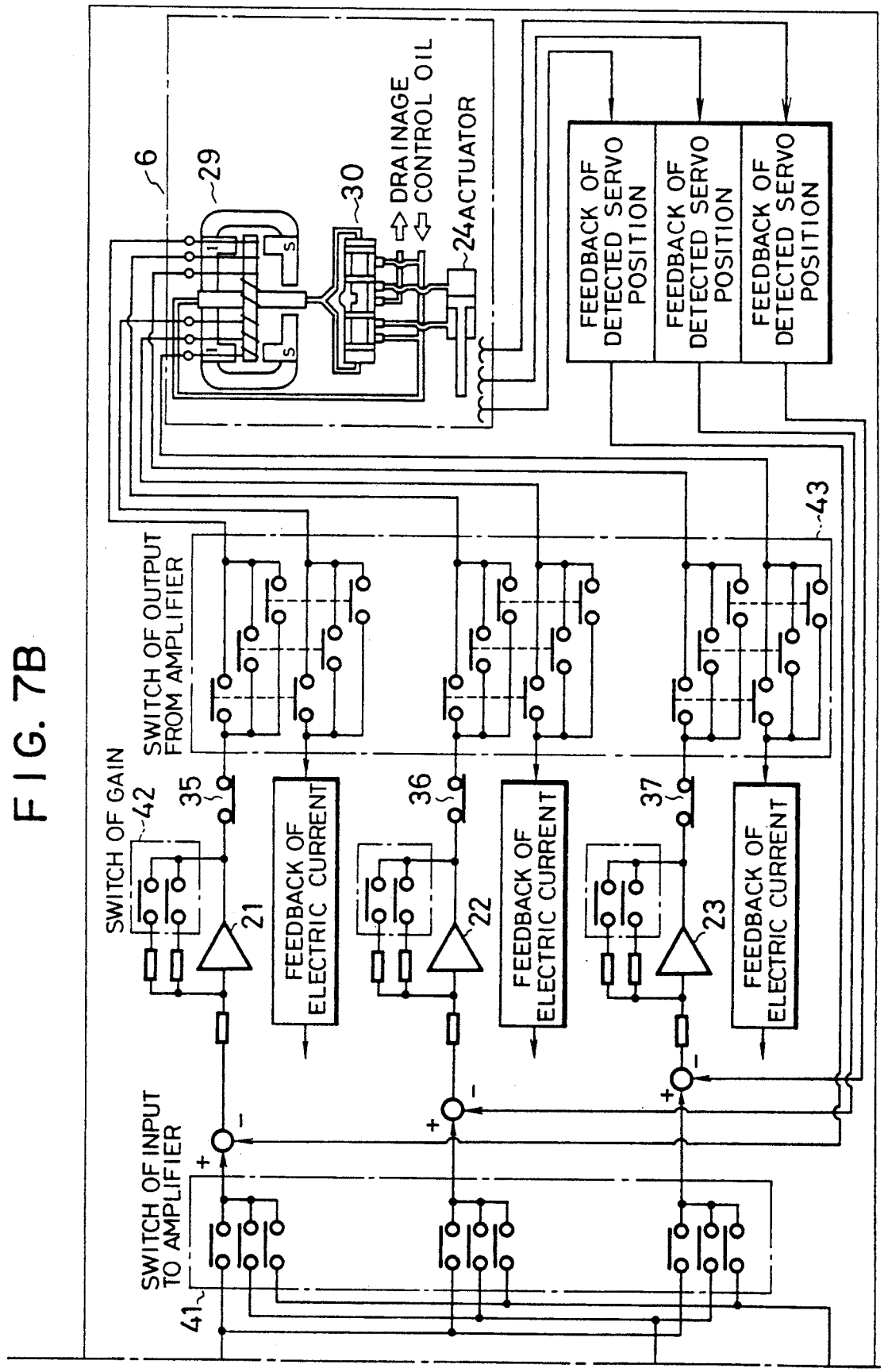

Another embodiment will now be described with reference to FIG. 7. This embodiment is arranged in such a manner that the sub-amplifier according to the above-described sub-amplifier is replaced by an amplifier input switch 41 which selects the control command value 20 of the normal controller. Furthermore, the servo amplifier according to this embodiment is provided with a gain switch 42 for switching over between the normal gain (gain at the time of one coil) and a two-coil gain which generates the coil electric current, which corresponds to a current generated by two coils, in order to operate the plant by one coil. The servo amplifier is further provided with an amplifier output switch 43 for performing a selection operation to supply the output from the servo amplifier to a normal coil.

The servo amplifier is provided for each of the systems A, B and C. The input at this time is performed in such a manner that the input of the normal controller is selected by the input switch 41. Then, a flow of the input performed in the amplifier of the system A will now be described with reference to FIG. 8.

The amplifier of the system A selects the controller of the system A. In a case where the controller of the system A is abnormal, determinations whether or not the controller of the system B and that of the system C are sequentially made. As a result, the input of the normal controller is selected by the amplifier input switch 41. The amplifier of the system B similarly receives the control command value 20 of the normal controller after the determinations about the systems <B>, <C> and <A> have been sequentially made. Also the amplifier of the system C similarly receives the control command value 20 of the normal controller after the determinations about the systems <C>, <A> and <B> have been sequentially made.

As a result, the control command value 20 of the normal controller is received by each of the servo amplifiers by the action of the switch 41.

Figure 8:
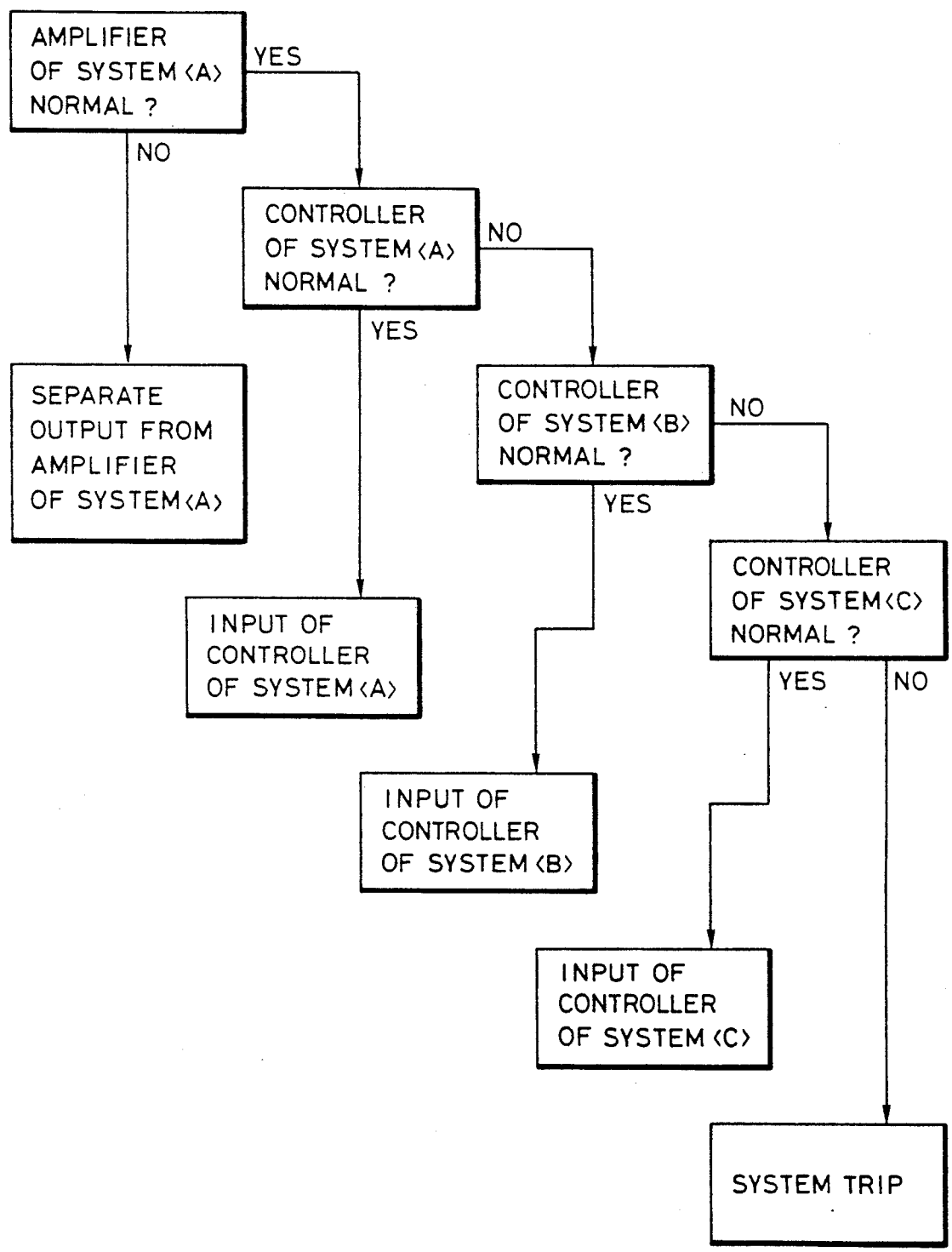
FIG. 8 is a flow chart for inputting of an amplifier of system A.

The above-described selections are executed by the action of the switch 41 in accordance with the flow chart shown in FIG. 8 and software.

Then, the operation of the gain switch 42 and that of the amplifier output switch 43 will now be described with reference to a flow chart, which illustrate the output from the amplifier of the system A and which is shown in FIG. 9.

In a case where the amplifier of the system A is abnormal, the output from it is separated by the output separation switch 35. In a case where the above-described amplifier is normal, a determination is made about the status of each of the coils A, B and C and that of the amplifier in order to determine the coil to which the output from the above-described amplifier is supplied. However, in a case where two coils of the three coils A, B and C are abnormal, it is necessary to give the residual coil the torque for the two coils. Therefore, a two-coil gain is selected as the gain at this time. Similarly, the amplifier output switch 43 is operated in order to make the normal amplifier to output in place of the abnormal amplifier in accordance with the status of each of the amplifiers A, B and C. For example, in a case where the coil of the system A is normal and as well as the coils of the systems B and C are abnormal, the two-coil gain is selected by the gain switch 42 in order to make the plant to be normally operated by only the coil of the system A. Furthermore, the output to the coil of the system A is made by the output switch 43 of the amplifier of the system A.

In a case where both the coils of the systems B and C or either of the same is normal in the above-described state, a 1-coil gain is selected by the gain switch 42 so that an output to the coil of the system A is made by the amplifier output switch 43. Subsequently, the amplifiers of the systems B and C are operated similarly.

The above-described selection is performed by the switch 43 in accordance with the flow chart shown in FIG. 9 and software.

Although the control of the triple-coil servo valve is described according to the above-described embodiment, a similar control can be performed in a servo valves having four or more coils by providing a compensation circuit.

As described above, according to the present invention, the triple-coil servo valve control method having a tripled controller and triple-coil servo valves at the operation end thereof can be arranged so as to obtain outputs from the servo coils which are sufficiently large to operate the plant even if two control systems, for example, the two controllers are abnormal or two servo coils are abnormal.

Furthermore, turbine control apparatus and a variety of plants which is provided with the triple-coil servo valve control apparatus according to the present invention are enable to continue the operation while preventing disturbance. Therefore, availability can be significantly improved in comparison to the conventional operation method.

Since the present invention can be executed simply by adding the above-described compensation apparatus, the rise in the overall cost can be prevented in comparison to the conventional structure while significantly improving the operation performance in comparison to the same.

Although the invention has been described in its preferred form with a certain degree of particularly, it is understood that the present disclosure of the preferred form has been changed in the details of construction and the combination and arrangement of parts may be resorted to without departing from the spirit and the scope of the invention as hereinafter claimed.

What is claimed is:

1. An apparatus for controlling a triple-coil servo valve having a control unit constituted by triple control systems each of which has components of a controller for outputting a control command signal for controlling the quantity of state of a plant in accordance with a predetermined value, a servo amplifier for amplifying said control command signal so as to be capable of operating said triple-coil servo valve and a coil for operating said servo valve to make the degree of opening of a fuel flow rate valve correspond to said amplified control signal, said apparatus for controlling a triple-coil servo valve comprising:

compensation means including a compensation circuit for compensating the output from said controller and a switch circuit for switching the connection between said compensation circuit and said components of said control systems; and abnormality detection means which detects the abnormality of said control system so as to operate said compensation means.

2. An apparatus for controlling a triple-coil servo valve having a control unit constituted by triple control systems each of which has components of a controller for outputting a control command signal for controlling the quantity of state of a plant in accordance with a predetermined value, a servo amplifier for amplifying said control command signal so as to be capable of operating said triple-coil servo valve and a coil for operating said servo valve to make the degree of opening of a fuel flow rate valve correspond to said amplified control signal, said apparatus for controlling a triple-coil servo value comprising:

compensation means including a compensation circuit for compensating the output from said controller and a switch circuit for switching the connection between said compensation circuit and said components of said control systems;

abnormality detection means which detects the abnormality of said control system so as to operate said compensation means; and means for separating, in a case where at least one controller or servo amplifier of said control systems is abnormal, the output of said servo amplifier of said abnormal control system from said coil of said abnormal control system.

3. A fuel flow rate control apparatus including a triple-coil servo value for a gas turbine comprising:

a control unit constituted by triple control systems each of which has a controller for outputting a control command signal for controlling the quantity of state of a plant in accordance with a predetermined value, a servo amplifier for amplifying said control command signal so as to be capable of operating said triple-coil servo valve and a coil for operating said servo valve to make the degree of opening of a fuel flow rate valve correspond to said amplified control signal;

compensating means including a compensation circuit for compensating the output from a normal controller for use to operate said servo valve in a case where two control systems of said three control systems are abnormal and a switch circuit for reconstituting a normal control system by switching the connection between said compensation circuit and the components of said control system;

abnormality detection means which detects the abnormality of said three control system so as to operate said compensation means;

a torque motor arranged to be operated by said coil;

an actuator arranged to be operated by said torque motor; and a fuel flow rate control valve arranged to be opened/closed by said actuator.

4. A fuel flow rate control apparatus including a triple-coil servo valve for a gas turbine comprising:

a control unit constituted by triple control systems each of which has a controller for outputting a control command signal for controlling the quantity of state of a plant in accordance with a predetermined value, a servo amplifier for amplifying said control command signal so as to be capable of operating said triple-coil servo valve and a coil for operating said servo valve to make the degree of opening of a fuel flow rate value correspond to said amplified control signal;

means for separating, in a case where at least one controller or servo amplifier of said control systems is abnormal, the output of said servo amplifier of said abnormal control system from said coil of said abnormal control system;

compensation means including a compensation circuit for compensating the output from a normal controller for use to operate said servo valve in a case where two control system of said three control systems are abnormal and a switch circuit for reconstituting a normal control system by switching the connection between said compensation circuit and the components of said control system;

abnormality detection means which detects the abnormality of said three control system so as to operate said compensation means;

a torque motor arranged to be operated by said coil;

an actuator arranged to be operated by said torque motor; and a fuel flow rate control valve arranged to be opened/closed by said actuator.

* * * * *